US006238603B1

(12) United States Patent
Turner et al.

(10) Patent No.: US 6,238,603 B1
(45) **Date of Patent: *May 29, 2001**

(54) WARE FORMING METHOD AND APPARATUS

(75) Inventors: John Barrie Turner; Robert Norman Deakin, both of Stoke-on-Trent; John Michael Victor Burnett, Wettenhall; Dennis Podmore, Newcastle, all of (GB)

(73) Assignee: British Ceramic Research Limited, Staffordshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/242,459

(22) PCT Filed: Aug. 28, 1997

(86) PCT No.: PCT/GB97/02297

§ 371 Date: May 3, 1999

§ 102(e) Date: May 3, 1999

(87) PCT Pub. No.: WO98/08662

PCT Pub. Date: Mar. 5, 1998

(30) Foreign Application Priority Data

Aug. 29, 1996 (GB) .................................................. 9618091

(51) Int. Cl.[7] ............................ C04B 33/00; B28B 7/12; B28B 13/06

(52) U.S. Cl. ......................... 264/40.3; 264/571; 264/299; 264/334; 264/335; 425/139; 425/437

(58) Field of Search .................................... 264/334, 335, 264/86, 87, 40.1, 40.3, 571, 299; 425/139, 84, 85, 437

(56) References Cited

U.S. PATENT DOCUMENTS

| | | | | |
|---|---|---|---|---|
| 2,584,109 | * | 2/1952 | Blackburn et al. .................. | 264/335 |
| 2,584,110 | * | 2/1952 | Blackburn et al. . | |
| 2,632,227 | * | 3/1953 | Steele et al. . | |
| 3,885,522 | * | 5/1975 | MacDonald et al. . | |
| 4,413,966 | * | 11/1983 | Mills et al. .......................... | 264/335 |
| 5,935,495 | * | 8/1999 | Turner et al. ........................ | 264/335 |

FOREIGN PATENT DOCUMENTS

| | | |
|---|---|---|
| 2 057 484 | 5/1971 | (FR) . |
| 2 343 571 | 10/1977 | (FR) . |
| 08216142 | 12/1996 | (KR) . |
| WO 96 31328 | 10/1996 | (WO) . |

* cited by examiner

*Primary Examiner*—Mathieu D. Vargot
(74) *Attorney, Agent, or Firm*—Adams, Schwartz & Evans, P.A.

(57) ABSTRACT

A method and apparatus for removing an item of shaped clay from a mould. The method including holding the piece (14) on a synthetic mould (10), pressing it against a resilient member (18) such that the member (18) substantially adopts the shape of the piece (14), and blowing the piece (14) off the mould (10), at which time the member (18) is compressed a little further to receive the clay (14) off the mould (10).

20 Claims, 2 Drawing Sheets

WARE FORMING METHOD AND APPARATUS

This application is a national stage application, according to Chapter II of the Patent Cooperation Treaty. This application claims the priority date of Aug. 29, 1996 for United Kingdom Patent Application No. 9618091.4.

This invention concerns a ware forming method and apparatus, and also particularly but not exclusively a method and apparatus for removing a piece of shaped clay from a mould.

Conventionally hollowware and flatware have been shaped on a roller machine With such a machine a plaster of paris mould is loaded onto the machine. Typically the mould is held in a metal mould carrier. A piece of clay is placed onto the mould which is then spun and a counter-rotating shaped roller head is brought into contact with the clay to provide the required shape. The ware carrying mould is then removed from the machine and placed in a drier to obtain mould release. Disadvantages are encountered with this system in that, as the shaped clay is held in the moulds during drying a large number of moulds are required which thus occupy a relatively large area in a production area.

WO A 96/31328 discloses a method and apparatus for removing an item of shaped clay from a mould.

According to the present invention there is provided a method of forming clayware, the method comprising locating a piece of clay on a mould, shaping the clay on the mould, locating a receiving member of a resilient material against the shaped clay on the opposite side thereof to the mould, urging the receiving member against the shaped clay such that said member substantially adopts the shape of the clay to provide a close fit thereagainst, and blowing a fluid through the mould to blow the shaped clay off the mould and onto the receiving member, such that as the shaped clay is blown off the mould, the receiving member is compressed a little further to receive the shaped clay off the mould.

The clay is preferably shaped by a roller head.

The invention also provides a method of removing a piece of shaped clay from a mould, the method comprising locating a receiving member of a resilient material against the shaped clay on the opposite side thereof to the mould, urging the receiving member against the shaped clay such that said member substantially adopts the shape of the clay to provide a close fit thereagainst, and blowing a fluid through the mould to blow the shaped clay off the mould and onto the receiving member, so that as the shaped clay is blown off the mould, the receiving member is compressed a little further to receive the shaped clay off the mould.

The fluid preferably comprises air, and the air may be warmed.

The receiving member preferably comprises a block of resilient material, which is desirably of greater thickness than the depth of the shaped clay.

Alternatively the receiving member may comprise a piece or pieces of resilient material mounted on a rigid support. The shape of the support may be adjustable, for instance to accommodate shaped articles of different depths.

A rigid member may be provided on a part of the receiving member to provide support for a part of the shaped clay, for instance the underside of a plate within the foot.

The receiving member may be formed such that it returns to substantially its initial shape whilst the shaped clay is thereon, after the mould has been moved away from said member.

The resilient material may comprise a sponge or foamed material, and preferably comprises a plastics material.

The receiving member may be shaped to support particular parts of the shaped clay when located thereon. For example, the receiving member may include an upstanding annular projection for supporting the rim of shaped clay flatware. For use with holloware an upstanding projection may be provided on the receiving member which is locatable within the shaped clay. Said projection may be shaped to substantially conform to the internal profile of the shaped clay.

The receiving member may be mounted on a carrier.

Air, which may be warmed, is preferably blown through the mould following removal of the shaped clay, to condition the mould.

First detection means may be provided for sensing when the shaped clay has been blown off the mould, and said means may comprise second detection means for sensing a reduction in the back pressure in the mould. The first detection means may be connected to means for automatically separating the mould and receiving member when the shaped clay has moved onto the latter.

The mould may be rotated relative to the receiving member once fluid is being blown through the mould, whereby to shear the water film between the mould and the clay.

The mould may be made of an acrylic plastics material and preferably an acrylic bead. The plastics material is preferably mounted on a carrier. The carrier may be made of a plastics material such as acrylic, or of metal. Alternatively the mould may be made of plaster of paris.

The invention also provides apparatus for removing a piece of shaped clay from a mould, the apparatus being usable with a method according to any of the preceding thirteen paragraphs.

The invention further provides apparatus for forming clayware, the apparatus being usable with a method according to any of the preceding sixteen paragraphs.

According to the present invention there is still further provided a receiving member usable in a method according to any of said preceding sixteen paragraphs.

Embodiments of the present invention will now be described by way of example only, with reference to the accompanying drawings, in which.

FIGS. 1 to 4 of the drawings show apparatus for removing an item of shaped clay from a mould. The clay is in the form of an item of flatware such as a plate. The drawings show a permeable synthetic mould 10. The mould 10 is made from an acrylic bead and has an upper surface shaped to correspond to the upper surface of a plate. The mould 10 is mounted on a carrier 12 also made of acrylic.

Figure 1:
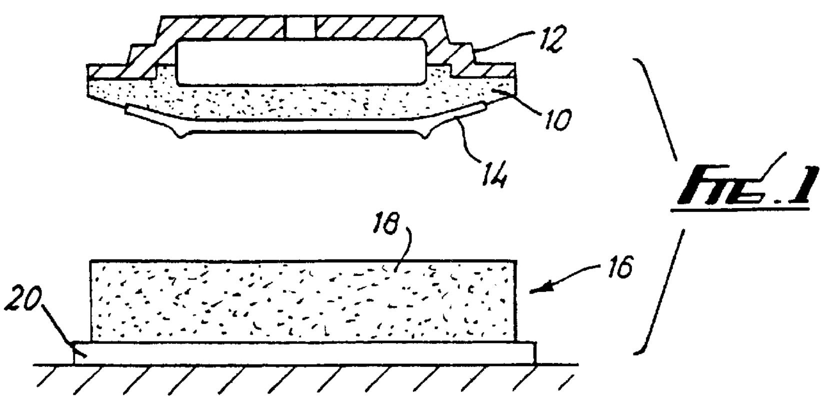
FIGS. 1–3 are diagrammatic cross-sectional side views showing sequential stages of a method according to the present invention using apparatus according to the present invention.
Figure 2:
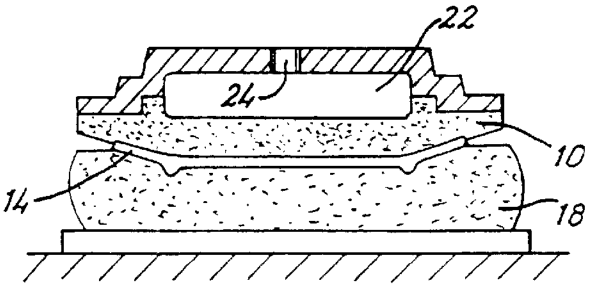

In a method according to the present invention, a piece of clay is located on the mould 10. The mould 10 is subsequently spun and a roller head (not shown) is used to form the piece of clay into a required shape 14. A receiving member 16 in the form of a cylindrical block 18 of plastics material sponge on a board 20 is provided. The block 18 is of greater diameter than the clay 14. The mould 10 carrying the clay 14 is lowered on to the member 16 and pressed thereagainst such that the cylindrical block 18 adopts the shape of the underside of the clay 14 as shown in FIG. 2. Simultaneously air is blown through the mould 10 towards the clay 14.

A chamber 22 is provided between the mould 10 and carrier 12. The chamber 22 is connectable to a source of above atmospheric pressure through an inlet 24. Passages (not shown) may be provided through the mould 10 to distribute above atmospheric pressure air from the chamber 22 evenly throughout the mould 10.

Figure 3:
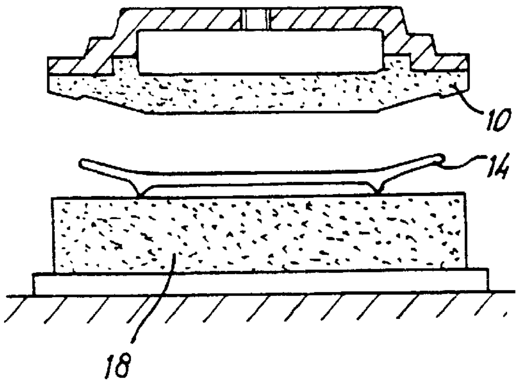

The above atmospheric pressure air blown through the mould 10 will blow the clay 14 thereoff. As the clay 14 is blown thereoff the block 18 is further compressed by the clay 14 such that a gap is formed between the clay 14 and mould 10. The mould 10 is subsequently moved away from the receiving member 16 and the block 18 returns to its original shape as indicated in FIG. 3. The clay 14 carried on the member 20 can then be dried. As the clay 14 sits proud on the block 18 drying also takes place to a degree over the underside of the clay 14. As the clay 14 is not on the mould 10 it can be dried relatively quickly. Warm air can be blown through the empty mould 10 to condition same by removing any moisture of other materials.

It has often been found to be advantageous to rotate the mould 10, usually a partial turn, relative to the receiving member 16 whilst air is being blown through the mould 10. This rotation shears the water film between the mould 10 and the clay 14.

There is thus described a method and apparatus which provide considerable advantages over existing arrangements. As the receiving member holds the clay against the mould as the clay is blown thereoff, this prevents distortion of the clay. This arrangement prevents air passing through a part of the mould and lifting for example an edge of the clay. As a result of the resilience of the receiving member, this member will be compressed a small amount as the clay is blown off the mould thereby providing an even release therefrom without damage occurring to the clay.

As the clay is removed rapidly from the relatively expensive mould, there is not the requirement to use a large number of such moulds. The receiving members can be made relatively inexpensively in contrast to the moulds. Also, each receiving member could be used with a wide range of different moulds thereby reducing the requirement for lots of different receiving members and also enabling short runs of different shaped articles to readily be carried out.

Figure 4:
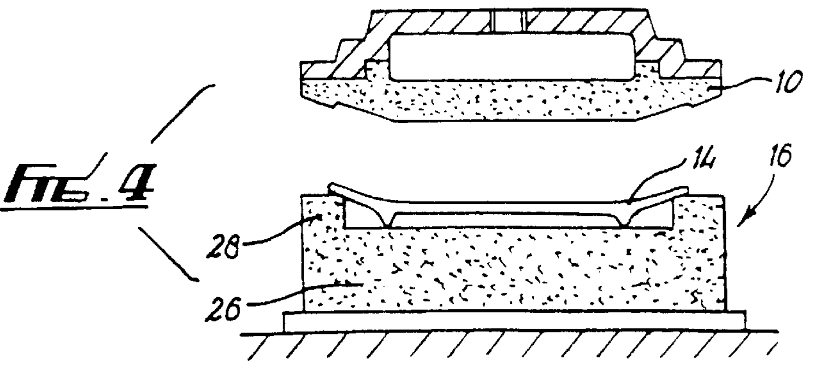
FIG. 4 is a similar view to FIG. 3 with a different apparatus.

Various modifications may be made without departing from the scope of the invention. FIG. 4, shows a similar apparatus to that shown in FIGS. 1–3 except that the receiving member 16 comprises a block 26 which has an upstanding peripheral rim 28. This rim 28 provides support for the rim of the shaped clay 14 following release from the mould 10. This means that the invention would be suitable for items with thin sections to provide support for the rim prior to and during drying.

Figure 5:
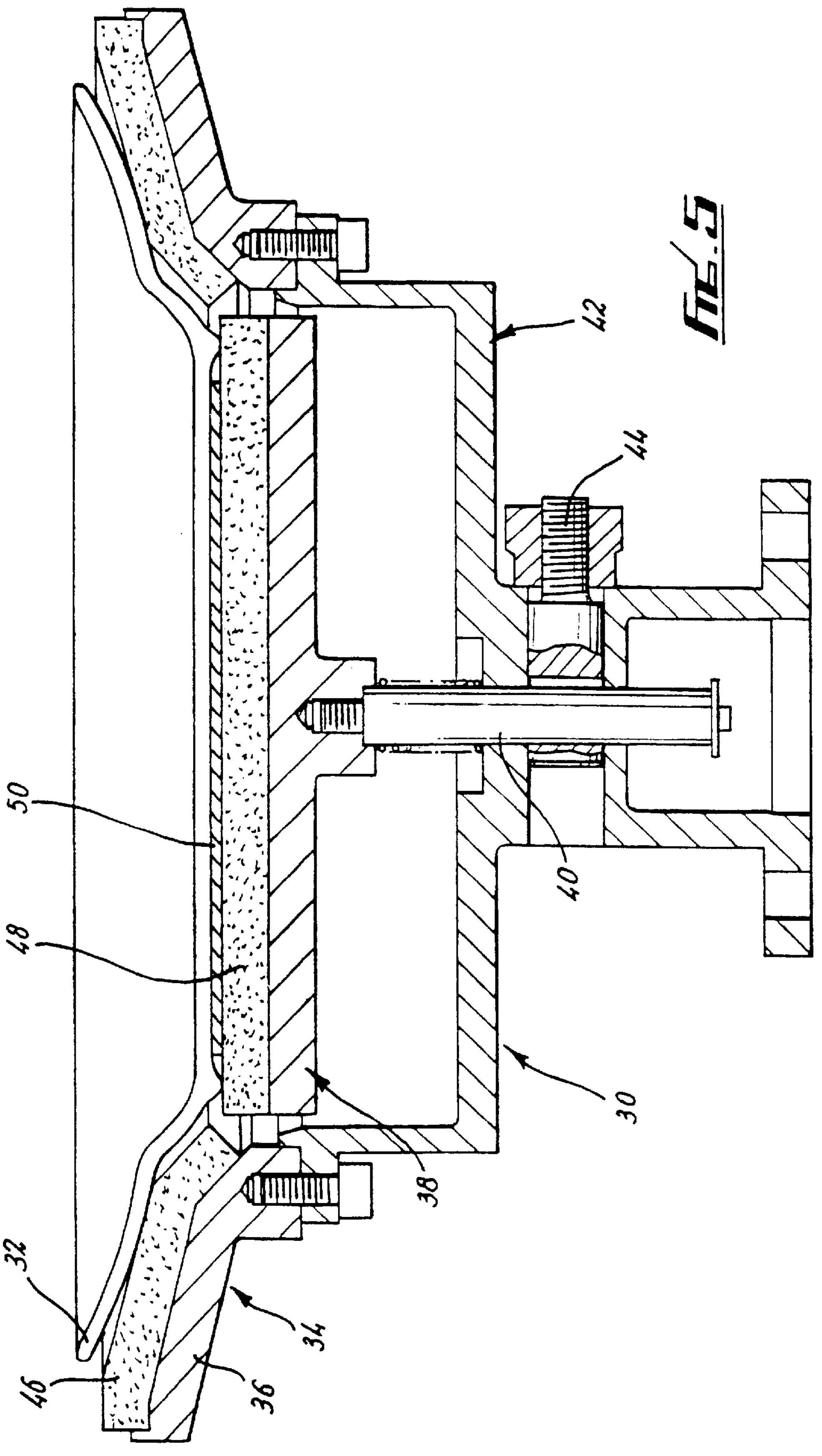
FIG. 5 is a similar view of part of a still further apparatus.

FIG. 5 shows a further alternative receiving member 30. The member 30 is intended for supporting an item of flatware such as the plate 32 shown in the figure. The member 30 comprises a rigid metal support 34. The support 34 comprises an annular portion 36 which slopes downwardly towards its centre to support the rim of the plate 32, and a separate central portion 38. The portion 38 is mounted on a pin 40 which is slidably mounted in a frame 42 to be movable towards or away from the portion 36. A locking screw 44 is provided to permit the portion 38 to be locked to the frame 42 in a required position. The frame 42 also mounts the annular portion 36.

Pieces of plastics material sponge 46,48 are mounted respectively on the annular and central portions 36,38. A relatively thin metal disc 50 is provided centrally on the piece 48, either loosely or mounted thereon. The disc 50 is of a smaller diameter than the piece 48.

In use, the receiving member 30 acts in a similar way to the receiving members 16 described above. The relative position of the central portion 38 is initially set dependent on the depth of the plate 32. The disc 30 provides support to the centre of the plate 32 to prevent sagging or collapse thereof. Local rigid support such as the disc 50 could be provided in different places to support parts of the clayware, and could also be used with the arrangements outlined in FIGS. 1 to 4.

The receiving members may have differently shaped blocks to provide support where required for the shaped clay. Whilst the invention is described above with regard to formation of an item of flatware, the invention is equally suited to holloware production. In this instance the block on the receiving member may be appropriately shaped and may be shaped to substantially adopt the interior shape of the holloware to provide support therefore during drying.

Various other modifications may be made. For example, the receiving member may be a different shape and/or may be made of different material. Whilst the above described example uses an acrylic mould, the invention is also readily applicable to plaster of paris moulds, or moulds made from any suitable permeable material, or which allow air to be blown through.

The method and apparatus readily lend themselves to automatic operation which would be arranged to supply clay onto a required mould. Means may be provided to indicate when the clay has been blown off the mould on to the receiving member, perhaps by detecting a drop in back pressure in the mould. Said indication means may be connected to means for automatically moving the mould away from the receiving member once this "blow off" has taken place.

Whilst endeavouring in the foregoing specification to draw attention to those features of the invention believed to be of particular importance, it should be understood that the Applicant claims protection in respect of any patentable feature or combination of features hereinbefore referred to and/or shown in the drawings whether or not particular emphasis has been placed thereon.

What is claimed is:

1. A method of removing a piece of shaped clay from a mould, characterised in that the method comprises locating a receiving member (16,30) of a resilient material against the shaped clay (14,32) on the opposite side thereof to the mould (10), urging the receiving member (16,30) against the shaped clay (14,32) such that said member (16,30) substantially adopts the shape of the clay (14,32) to provide a close fit thereagainst, and blowing a fluid through the mould (10) to blow the shaped clay (14,32) off the mould (10) and onto the receiving member (16,30), so that as the shaped clay (14,32) is blown off the mould (10), the receiving member (16,30) is compressed a little further to receive the shaped clay (14,32) off the mould (10).

2. A method according to claim 1, characterised in that the fluid comprises air.

3. A method according to claim 2, characterised in that the air is warmed.

4. A method according to claim 1, characterised in that the receiving member (16,30) is mounted on a carrier (20,42).

5. A method according to claim 1, characterised in that air is blown through the mould (10) following removal of the shaped clay (14,32), to condition the mould (10).

6. A method according to claim 5, characterised in that the air is warmed.

7. A method according to claim 1, and comprising detection means, wherein said detection means comprises first detection means for sensing when the shaped clay (14,32) has been blown off the mould (10).

8. A method according to claim 7, characterized in that said detection means further comprises second detection means for sensing a reduction in the back pressure in the mould (10).

9. A method according to claim 7, characterised in that the first detection means is connected to means for automatically separating the mould (10) and receiving member (16,30) when the shaped clay (14,32) has moved onto the latter.

10. A method according to claim 1, characterised in that the mould (10) is rotated relative to the receiving member (16,30) once fluid is being blown through the mould (10), whereby to shear the water film between the mould (10) and the clay (14,32).

11. Apparatus for removing a piece of shaped clay from a mould, the apparatus comprising a receiving member (16,30) locatable against the shaped clay (14,32) on the opposite side thereof to the mould (10), characterized in that the receiving member (16,30) is made of a resilient material such that when it is urged against the shaped clay (14,32) said member (16,30) substantially adopts the shape of the clay (14,32) to provide a close fit thereagainst, and means to blow a fluid through the mould such that when a fluid is blown through the mould (10) to blow the shaped clay (14,32) off the mould (10) and onto the receiving member (16,30), as the shaped clay (14,32) is blown off the mould (10), the receiving member (16,30) is compressed a little further to receive the shaped clay (14,32) off the mould (10).

12. Apparatus according to claim 11, characterised in that the receiving member (16,30) comprises a block (18,26) of greater thickness than the depth of the shaped clay (14).

13. Apparatus according to claim 11, characterised in that the receiving member (30) comprises a piece or pieces of resilient material (46,48) mounted on a rigid support (34).

14. Apparatus according to claim 11, characterised in that a rigid member (50) is provided on a part of the receiving member (16,30) to provide support for a part of the shaped clay.

15. Apparatus according to claim 11, characterised in that the resilient material comprises a sponge or foamed material.

16. Apparatus according to claim 11, characterised in that the receiving member (16,30) is formed such that it returns to substantially its initial shape whilst the shaped clay (14,32) is thereon, after the mould (10) has been moved away from said member (16,30).

17. Apparatus according to claim 11, characterised in that the receiving member (16,30) is shaped to support particular parts of the shaped clay (14,32) when located thereon.

18. Apparatus according to claim 17, characterised in that the receiving member (16,30) includes an upstanding annular projection (28,36) for supporting the rim of shaped clay flatware (14,32).

19. Apparatus according to claim 17, characterised in that for use with holloware an upstanding projection is provided on the receiving member (16,30) which is locatable within the shaped clay.

20. Apparatus according to claim 19, characterised in that said projection is shaped to substantially conform to the internal profile of the shaped clay.

* * * * *